US011279371B2

(12) United States Patent
Landfors

(10) Patent No.: US 11,279,371 B2
(45) Date of Patent: Mar. 22, 2022

(54) METHOD, SYSTEM AND VEHICLE FOR USE OF AN OBJECT DISPLAYING DEVICE IN A VEHICLE

(71) Applicant: VOLVO CAR CORPORATION, Gothenburg (SE)

(72) Inventor: Per Landfors, Hisings Backa (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 15/708,538

(22) Filed: Sep. 19, 2017

(65) Prior Publication Data
US 2018/0086265 A1 Mar. 29, 2018

(30) Foreign Application Priority Data

Sep. 26, 2016 (EP) .................................. 16190588

(51) Int. Cl.
*B60W 50/08* (2020.01)
*B60W 50/16* (2020.01)
*B62J 50/22* (2020.01)
*B60Q 9/00* (2006.01)
*B60R 1/00* (2022.01)
*B60W 50/00* (2006.01)

(52) U.S. Cl.
CPC ............. *B60W 50/08* (2013.01); *B60Q 9/008* (2013.01); *B60R 1/00* (2013.01); *B60W 50/16* (2013.01); *B62J 50/22* (2020.02); *B60K 2370/184* (2019.05); *B60R 2300/8093* (2013.01); *B60W 2050/0025* (2013.01); *B60W 2050/0075* (2013.01); *B60W 2540/215* (2020.02); *B60W 2554/80* (2020.02)

(58) Field of Classification Search
None
See application file for complete search history.

(56) References Cited

U.S. PATENT DOCUMENTS

| 7,706,978 B2 * | 4/2010 | Schiffmann | ........... G01S 7/4026 701/301 |
| 9,168,869 B1 * | 10/2015 | Kamal | ............... G02B 27/0101 |
| 9,317,759 B2 * | 4/2016 | Inada | ........................ B60R 1/00 |

(Continued)

FOREIGN PATENT DOCUMENTS

| CN | 102407776 A | 4/2012 |
| CN | 103661374 A | 3/2014 |

(Continued)

OTHER PUBLICATIONS

Extended European Search Report dated Mar. 29, 2017, Application No. 16190588.0-1762, Applicant Volvo Car Corporation, 8 Pages.

(Continued)

*Primary Examiner* — Fekadeselassie Girma
(74) *Attorney, Agent, or Firm* — Brooks Kushman P.C.

(57) ABSTRACT

Embodiments herein relate to a method for handling a driver's use of an object displaying device comprised in a vehicle. The driver's use of the object displaying device is monitored. Based on the monitoring, a likelihood that the driver has detected a representation of the object when using the object displaying device is determined. The representation of the object is visible to the driver in the object displaying device, and the object is located in the surroundings of the vehicle.

17 Claims, 3 Drawing Sheets

(56) References Cited

U.S. PATENT DOCUMENTS

| | | | |
|---|---|---|---|
| 9,626,866 B2* | 4/2017 | Waite | G08G 1/09623 |
| 9,690,104 B2* | 6/2017 | Kim | G06F 3/04815 |
| 9,718,406 B2 | 8/2017 | Mangin | |
| 2004/0178890 A1 | 9/2004 | Williams et al. | |
| 2012/0072103 A1 | 3/2012 | Backman | |
| 2013/0222212 A1* | 8/2013 | Lorenz | B60Q 1/00 345/7 |
| 2013/0307771 A1* | 11/2013 | Parker | G06F 3/0482 345/158 |
| 2013/0314503 A1* | 11/2013 | Nix | G06K 9/00805 348/46 |
| 2014/0070934 A1* | 3/2014 | Chau | B60K 37/00 340/438 |
| 2014/0101543 A1* | 4/2014 | Curin | B60K 35/00 715/271 |
| 2014/0191940 A1* | 7/2014 | Edgren | G06F 3/04815 345/156 |
| 2014/0348389 A1* | 11/2014 | Graumann | B60W 50/08 382/104 |
| 2015/0232030 A1* | 8/2015 | Bongwald | G02B 27/0093 348/115 |
| 2016/0016515 A1 | 1/2016 | Mangin | |
| 2016/0114728 A1* | 4/2016 | Tan | B60R 1/00 348/148 |
| 2016/0144784 A1* | 5/2016 | Kwon | G01S 15/931 340/435 |
| 2016/0207455 A1* | 7/2016 | Kim | B60W 40/08 |
| 2016/0216521 A1* | 7/2016 | Yachida | G02B 27/0179 |
| 2016/0342849 A1* | 11/2016 | Kiyo | G01S 15/89 |
| 2018/0025240 A1* | 1/2018 | Klement | H04N 13/239 348/47 |
| 2018/0032300 A1* | 2/2018 | Singh | B60Q 9/00 |
| 2018/0059779 A1* | 3/2018 | Sisbot | G06K 9/00805 |
| 2018/0065482 A1* | 3/2018 | Yagyu | B60K 35/00 |
| 2018/0070388 A1* | 3/2018 | Maxwell | B60R 1/00 |
| 2018/0095590 A1* | 4/2018 | Olien | B60K 37/06 |
| 2018/0134285 A1* | 5/2018 | Cho | B60Q 9/00 |
| 2018/0257565 A1* | 9/2018 | Nogimori | B60W 50/14 |
| 2018/0299889 A1* | 10/2018 | Yokota | B60W 50/082 |

FOREIGN PATENT DOCUMENTS

| | | |
|---|---|---|
| CN | 105313780 A | 2/2016 |
| EP | 3040809 A1 | 7/2016 |
| GB | 2500690 A | 10/2013 |
| WO | 2011075392 A1 | 6/2011 |

OTHER PUBLICATIONS

Chinese Office Action for Appl. No. CN201710810577.2 dated Jul. 3, 2020.

Second Office Action for Chinese Application No. 201710810577.2, dated Mar. 2, 2021, 8 Pages.

* cited by examiner

METHOD, SYSTEM AND VEHICLE FOR USE OF AN OBJECT DISPLAYING DEVICE IN A VEHICLE

CROSS-REFERENCE TO RELATED APPLICATIONS

This application claims foreign priority benefits under 35 U.S.C. § 119(a)-(d) to European patent application number EP 16190588.0, filed Sep. 26, 2016, now European Patent No. EP 3299241 B 1, which issued Nov. 10, 2021, which is incorporated by reference in its entirety.

TECHNICAL FIELD

Embodiments herein relate generally to a method, system and vehicle. More particularly the embodiments herein relate to use of an object displaying device comprised in a vehicle.

BACKGROUND

Today, advanced driver assistance systems such as automatic braking, adaptive cruise control and semi-/fully autonomous parking functions do not take into consideration whether the driver has observed a potential threat, such as an upcoming or oncoming vehicle or pedestrian. If the system (s) would have this information, thresholds, such as time gap to vehicle in front, timing of auto brake and forward collision warning, could be adjusted so that an accident is less likely to occur and/or that nuisance of false or early warnings/interventions is minimized. Warnings and interventions could even be excluded if the driver has observed a potential threat, also leading to more trust and less nuisance in the systems.

One source of information that could be used for understanding if the driver has observed potential threats relevant from e.g., a collision perspective such as upcoming or oncoming vehicles or pedestrians is to monitor the driver's usage of mirrors such as the side mirrors and rear view mirror and other visual aids such as surround view cameras or other cameras placed around the vehicle.

To decrease the likelihood of being in an accident, there is also a need for helping the driver to improve his/her usage behavior of the vehicle's object displaying devices.

Vehicles today may be equipped with systems that can detect whether the driver is tired or inattentive by using e.g., technology that observe the driver's head and eyes. These systems play a role in achieving the above.

SUMMARY

An objective of embodiments herein is therefore to obviate at least one of the above disadvantages and to provide improved safety in a vehicle.

According to a first aspect, the objective is achieved by a method for handling a driver's use of an object displaying device comprised in a vehicle. The driver's use of the object displaying device is monitored. Based on the monitoring, a likelihood of that the driver has detected a representation of the object when using the object displaying device is determined. The representation of the object is visible to the driver in the object displaying device. The object is located in the surroundings of the vehicle.

According to a second aspect, the objective is achieved by a system for handling a driver's use of an object displaying device comprised in a vehicle. The system is adapted to monitor the driver's use of the object displaying device. The system is adapted to, based on the monitoring, determine a likelihood of that the driver has detected a representation of the object when using the object displaying device. The representation of the object is visible to the driver in the object displaying device. The object is located in the surroundings of the vehicle.

Thanks to the determining of the likelihood of that the driver has detected a representation of the object when using the object displaying device, the vehicle safety is improved.

Embodiments herein afford many advantages, of which a non-exhaustive list of examples follows:

An advantage of the embodiments herein is that systems which have access to the information about the determined likelihood could adjust its thresholds so that e.g., at least one of a better time gap to the vehicle in front is chosen, a better timing of auto brake and forward collision warning is chosen. This leading to for example decreased likelihood of accidents occurring and that nuisance of false or early warnings/interventions is minimized. Warnings and interventions could even be excluded if the driver has observed a potential threat, also leading to more trust and less nuisance in the systems.

An advantage of the embodiments herein is that they improve the driver's use of object displaying devices such as e.g., mirrors and other visual aids. With the improved use, visually identifiable threats are identified and safety is improved. For example, the driver may be reminded to take another or closer look in one or several object displaying devices if there is a risk that the driver has not seen a relevant object with high threat/severity level.

Based on usage behavior over time, the driver can get recommendations of how to change his/her way of using the object displaying devices.

The embodiments herein are not limited to the features and advantages mentioned above. A person skilled in the art will recognize additional features and advantages upon reading the following detailed description.

BRIEF DESCRIPTION OF THE DRAWINGS

Embodiments according to the disclosure will now be further described in more detail in the following detailed description by reference to the attached drawings.

The drawings are not necessarily to scale and the dimensions of certain features may have been exaggerated for the sake of clarity. Emphasis is instead placed upon illustrating the principle of the embodiments herein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
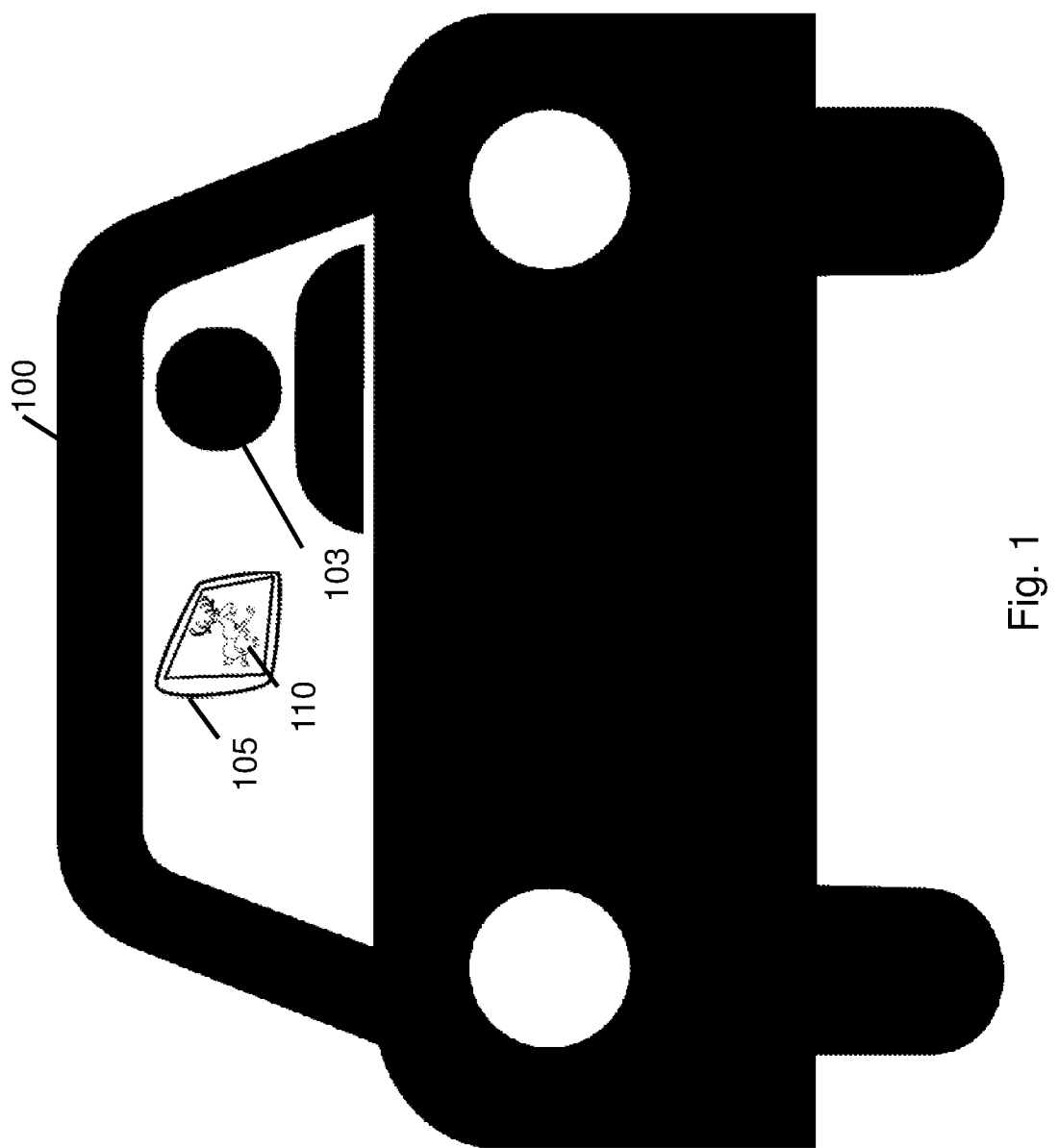
FIG. 1 is a schematic illustration of a vehicle.

FIG. 1 depicts a vehicle 100. The vehicle 100 may be any arbitrary vehicle, for instance a car, truck, lorry, van, bus, motorcycle, etc. The vehicle 100 may be at least partly autonomous or self-driven, it may be non-autonomous, etc.

The vehicle 100 may be used and driven by a driver 103. The driver 103 may also be referred to as a user of the vehicle 100, a chauffeur, etc. The vehicle 100 may comprise at least one object displaying devices 105 which is adapted to display an object 110 or a representation of the object 110 to the driver 103. In one example, the vehicle 100 comprises a plurality of object displaying devices 105. Thus, the vehicle 100 may comprise one or more object displaying devices 105. The object 110 may be located in the surroundings of the vehicle 100 and the driver 103.

An object displaying device 103 may be a mirror or a display. The object displaying devices 105 may be located at different locations on the inside and on the outside of the vehicle 100.

The object 110 may be for example an animal, another vehicle, a building, etc. The object 110 may be a risk to the vehicle 100, e.g., in the form of a collision.

The vehicle 100 may comprise a driver monitoring device (not illustrated in FIG. 1) such as e.g., a driver monitoring camera. The driver monitoring device may be located at any suitable location in the vehicle 100. The driver monitoring device is adapted to monitor the driver, e.g., movements of the driver's head, the driver's eye direction, etc.

The vehicle 100 may comprise an interface, such as a touch interface (not shown in FIG. 1) which may enable the driver 103 to indicate that he/she is actually monitoring what is going on, i.e., on a display. For example, the driver 103 may click on a button on the touch interface to confirm that he/she has detected another vehicle in the other lane by looking in the object displaying device 105. In other words, the driver 103 has the risk situation under control. This may for example be of use during autonomous parking. The interface may comprise one or more microphones, enabling the driver 103 to provide the indication orally.

The vehicle 100 may comprise systems such as a collision warning system, an autonomous parking system, a blind spot information system and a safety and driver support system.

The method for handling a driver's 103 use of an object displaying device 105 comprised in a vehicle 100 according to some embodiments will now be described with reference to the flowchart depicted in FIG. 2. When the object displaying device 105 is exemplified with a mirror, the method may be referred to as a Mirror Behavior Detection (MBD) function or system. The method illustrated in FIG. 2 comprises at least some of the following steps, which steps may as well be carried out in another suitable order than described below.

Step 201

The driver's 103 use of the object displaying device 105 is monitored. When monitoring the use of the object displaying device 105, it refers to monitoring whether the driver 103 looks into the object displaying device 105 with his eyes. It is not necessary to monitor where in the object displaying device 105 the driver 103 is looking, but only that he/she is looking into the device 105.

The monitoring may be performed by a driver monitoring device (not illustrated in FIG. 1) such as e.g., a driver monitoring camera. The driver monitoring device may be located at any suitable location in the vehicle 100. The driver monitoring device may continuously monitor the driver 103 or it may monitor in regular intervals.

As mentioned above, the object displaying device 105 may be at least one of a mirror and a display which makes the object 110 or a representation of the object 110 visible to the driver 103 when he/she looks into the object displaying device 105.

The monitoring may provide at least one of: glance time information, head direction information, gaze direction information and eye opening information, etc. The glance time information may indicate a glance time for the driver's 103 glance into the object displaying device 105. The head direction information may indicate a head direction of the driver 103 in relation to the object displaying device 105. The eye opening information may indicate a degree of opening of the driver's 103 eyes when glancing into the object displaying device 105. The gaze direction provides information related to where the driver's 103 eyes are directed. The head direction information is a rougher estimate of where the driver 103 is looking (rougher than the gaze direction information). So if the gaze direction information is available (and if it can be trusted), the gaze direction information is used instead of or in addition to the head direction information.

Step 202

Based on the monitoring, a likelihood of that the driver 103 has detected a representation of the object 110 when using the object displaying device 105 is determined. In more detail, the likelihood of that the driver 103 has detected the representation of the object 100 may involve a likelihood of that the driver 103 is aware of the object 110, what the object 110 is and in which way the object 110 is related to the vehicle 100 (e.g., if and how the object 110 is getting close to the vehicle 100). The representation of the object 110 is visible to the driver 103 in the object displaying device 105. The object 110 is located in the surroundings of the vehicle 100.

The detected object 110 may be an object 110 which is currently physically visible or it may be physically visible in close future to the driver 103.

The representation of the object 110 may be a picture or video of the object 110, it may be a symbol or a graphic representing the object 110, or any suitable representation which indicates that there is something in the surroundings of the vehicle 100 that the driver 103 should pay its attention to.

As mentioned earlier, the vehicle 100 may comprise one or more object displaying devices 105. The representation of the object 110 may be visible in at least two of these object displaying devices 105, i.e., visible in at least two of the one or more object displaying devices 105.

A weight parameter may be associated with each of the at least two object displaying devices 105 in the likelihood determination. The weight parameter may be based on at least one of: a distance between the object 110 and the vehicle 100, an object size, the size of the object displaying device 105, etc. For example, an object displaying device with a large size may be associated with a large weight parameter.

The likelihood determination may be further based on at least one of: a size of the object 110, distance between the object 110 and the vehicle 100, a contrast of the object 110 in relation to the vehicle's surroundings, light conditions, sun angle in relation to the vehicle 100, the object's motion (acceleration, speed, jerk, etc.). Information indicating the size of the object 110, distance to the object 110 and its motion (acceleration, speed, jerk, etc.) may be determined by sensor data from e.g., radars, lidars, cameras and ultrasonic sensors comprised in the vehicle 100. The contrast of the object 110 in the object displaying device 105 may be determined or at least partially determined by a camera sensor. External and internal light conditions and sun angle may be determined by light or camera sensors. For example, a long distance between the object 110 and the vehicle 100 means that the representation of the object 110 has a small size (smaller than the real size of the object 110) in the object displaying device 105. So, a small size of the representation of the object 110 may lead to a low likelihood of that the driver 103 has detected the object 110. The light conditions may be the conditions outside or inside the vehicle 100. If lamps are lit inside the vehicle 100, it may be more difficult to see an object 110 in the surroundings of the vehicle 100 when it is dark outside due to a mirror effect in the vehicle's 100 windows. Thus, the likelihood may be lower if it is dark outside the vehicle 100 compared to when it is light outside. With regards to the object's 110 motion, an example may be that if the representation of the object 110 is seen as moving in the object displaying display 105, the likelihood for that the driver 103 has seen the object 110 is larger than if the object 110 is not moving (a human driver 103 is good at detecting movement, even if the object 110 has a small size).

As mentioned above, the likelihood determination may for example be based on the size of the object 110. In an example where the object displaying device 105 is a display, the size of the object 110 may be replaced by information about the number of pixels (the area) which the object 110 has in the display (i.e., the size of the representation of the object 110 in the display). In an example where the object displaying device 105 is a mirror, it is not possible to measure the number of pixels. In such mirror example, the object's size in the mirror may be estimated by using information from a camera and a radar system. Information indicating the type of object 110 (the type of the object may be equivalent to an approximately front area of the object 110) can be reported by the camera, and the distance between the vehicle 100 and the object 110 may be obtained via e.g., radar, lidar or ultrasound devices comprised in or onboard the vehicle 100.

The likelihood may be determined further based on whether at least one of a haptic feedback device or an acoustic feedback device is activated or not within the vehicle 100. The haptic feedback device and the acoustic feedback device may indicate to the driver 103 that the object 110 is located in the surroundings of the vehicle 100. For example, haptic feedback (e.g., vibrations in the steering wheel) may indicate to the driver 103 that the object 110 is in the surroundings of the vehicle 100. Even acoustic information may indicate that there is an object 110 in the vehicle's 100 surroundings, typically an acoustic reverse gear warning. If either the haptic feedback or the acoustic information is activated in the vehicle 100, the likelihood that the object 110 has been identified is higher than if they are not activated.

The determined likelihood may be provided to at least one of: a collision warning system, an autonomous parking system, a blind spot information system and a safety and driver support system comprised in the vehicle 100.

The determined likelihood may be referred to as an instantaneous or momentary likelihood which implies that the determined likelihood is the likelihood of that the driver 103 has detected a representation of the object 110 which currently is in the surroundings of the vehicle 100 or which will be in the surroundings of the vehicle 100 in close future. The determined likelihood is instantaneous in contrast to statistical information. Statistical information will be described in more detail with reference to step 205 below.

Summarized, a likelihood that the driver 103 has detected and identified a specific object 110 based on the driver glance time, head direction (into available mirrors and/or displays), eye opening, the size of the object 110, distance to the object 110, the contrast of object 110 in relation to the surroundings, light conditions, sun angle, etc. The different mirrors 105 and displays 105 may be weighed differently in the likelihood evaluation based on where the object 110 is with respect to the vehicle 100, its size, etc. A driver monitoring camera may be used for detecting eye gaze, head direction/rotation and eye opening, etc.

Step 203

Step 203 is an optional step. A confirmation of that the driver 103 has detected the representation of the object 110 when using the object displaying device 105 may be obtained. The confirmation may be obtained from the driver 103 when he/she e.g., presses a confirmation button, enters a voice confirmation command, etc.

If the driver 103 has confirmed that he/she has seen the object 110, this confirmation information can be used as input to other systems in the vehicle 100. For example, to allow certain vehicle functionality (e.g., different functions related to autonomous driving or parking) or to adapt safety or driver support functions.

Step 204

Step 203 described above is not necessary for the execution of step 204. Thus, step 204 may be performed after step 202 or after step 203. Based on the determined likelihood, feedback may be provided to the driver 103 related to its usage of the object displaying device 105. For example, if the likelihood that the driver 103 has used the object displaying device 105 is low, the feedback may comprise an audio alarm which indicates to the driver 103 that he/she should increase the use the object displaying device 105. In another example, the feedback which indicates to the driver 103 that he/she should increase his/her use of the object displaying device 105 may be a message or a symbol appearing on a display in front of the driver 103.

When providing the feedback, the determined likelihood may be compared with a threshold. For example, if the determined likelihood is below or equal to the threshold, it may be a low likelihood that the driver 103 has seen the representation of the object 110 in the object displaying device 105. If the determined likelihood is above the threshold, it may be a high likelihood that the driver 103 has seen the representation of the object 110 in the object displaying device 105.

Step 205

Monitoring information which indicates the driver's 103 use of the object displaying device 105 over time may be stored, e.g., in a memory unit. Such stored monitoring information may provide statistics of how well the driver 103 uses the object displaying devices 105 over time.

Step 206

Safety and driver support system comprised in the vehicle 100 may be adapted based on the determined likelihood from step 202 and possible also based on the stored information from step 205. In other words, the adaptation may be based on instantaneous likelihood information and possibly also based on statistical likelihood information. For example, thresholds and timing of warnings in safety and driver support system may be adapted based on the likelihood (instantaneous and statistical likelihood). The safety and driver support system may be referred to as an active safety and driver support system or a passive safety and driver support system. An active safety system may be described as a safety system that assists the driver 103 in avoiding accidents, such as assisting in steering and braking. A passive safety system may be described as features that help reducing the effects of an accident, such as seat belts, airbags, etc. The safety and driver support system may also be referred to as a safety and driver support function. The safety and driver support system is a system adapted to help avoid accidents and to assist the driver 103 to drive the vehicle 100 safely. The safety and driver support system may be one system, or it may be several systems where one system is responsible for safety and another system is responsible for driver support. A driver support system and a safety system may use the likelihood in the same way.

The statistics of how well the driver 103 uses the object displaying device 105 to detect surrounding objects 110 (from step 205), in addition to the instantaneous likelihood determined in step 202, can be used (e.g., object displaying device use over time) in various cases. For example, the statistics may be used to estimate over time how safe the driver 103 drives the vehicle 100. It may be used by collision avoidance functions such as Forward Collision Warning and Lane Keeping Aid for example in order to adjust thresholds. It may be used by driver support functions such as Adaptive Cruise Control or other autonomous driving functions to adapt e.g., time gap and other margins to other vehicles and objects. It may be used for automatic activation of active safety and/or driver support functions which are previously not activated. It may be used to provide recommendation of a change in object displaying device usage behavior such as longer glance times, reminder of using one or several mirrors and/or displays, etc.

There may be multiple ways the determined likelihood may be used, for example in parking scenarios, in overtaking scenarios, driver feedback, etc. The determined likelihood may also be used together with each object's 110 threat/severity level. For examples in parking scenarios, a collision warning functionality of the vehicle 100 may be activated and or its thresholds may be adjusted. If the object 110 is a threat to the vehicle 100, e.g., another vehicle approaching with high speed from behind (i.e., a high threat/severity level), it is important that the driver 103 has detected the object 110. This means that systems and functions in the vehicle 100 do not only take the determined likelihood into account, but also the object's 110 threat/severity level. If the object 110 is not a threat, the likelihood of that the driver 103 has detected the object 110 is less important (e.g., when selecting function thresholds in the safety and driver support systems). Furthermore, in parking scenarios, autonomous parking may be disabled if the driver 103 is not observing one or several surrounding objects 110 (i.e., when the determined likelihood is low). The autonomous parking may be enabled if a good overview of the surroundings is shown (i.e., the determined likelihood is high).

In overtaking scenarios and if the driver 103 has not observed an upcoming vehicle (i.e., when the determined likelihood is low), the vehicle 100 may be steered back into lane if trying to go out in the adjacent lane. Another example is that Blind Spot Information System-warnings may be suppressed or made less intrusive if it is very likely that the driver 103 has seen the object 110 in the object displaying device 105 (i.e., when the determined likelihood is high). The driver 103 may be reminded to use the mirror(s) 105 when he/she is changing lane without using the mirror(s) 105 (i.e., when the determined likelihood is low).

As previously mentioned, the driver 103 may be provided with feedback on his/hers mirror and display usage. In other words, the driver 103 may be reminded to take another or closer look in one or several mirrors 105 or displays 105 if there is a risk that the driver 103 has not seen a relevant object 110 with high threat/severity level (i.e., when the likelihood is determined to be low). A threat assessment algorithm may be continuously run in one of the vehicle's 100 control units. The algorithm may take input from the vehicle's 100 sensors into account, such as cameras, radar, lidar, ultrasound sensors, etc. A collision likelihood related to surrounding objects may be derived by the threat assessment algorithm.

Figure 2:
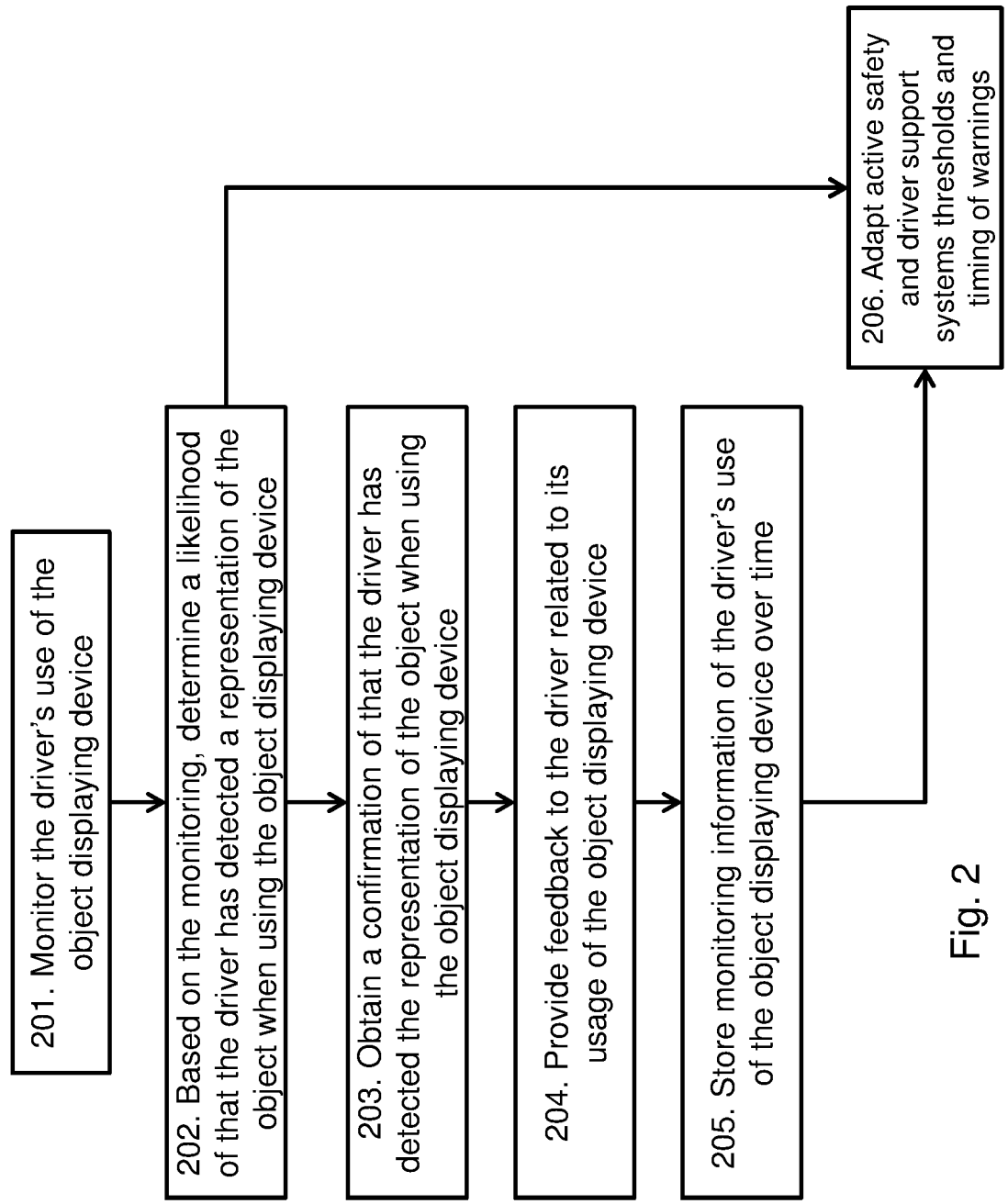
FIG. 2 is a flow chart illustrating embodiments of a method.

The method steps illustrated in FIG. 2 may be executed by a system. At least part of the system may be implemented in the vehicle 100.

Figure 3:
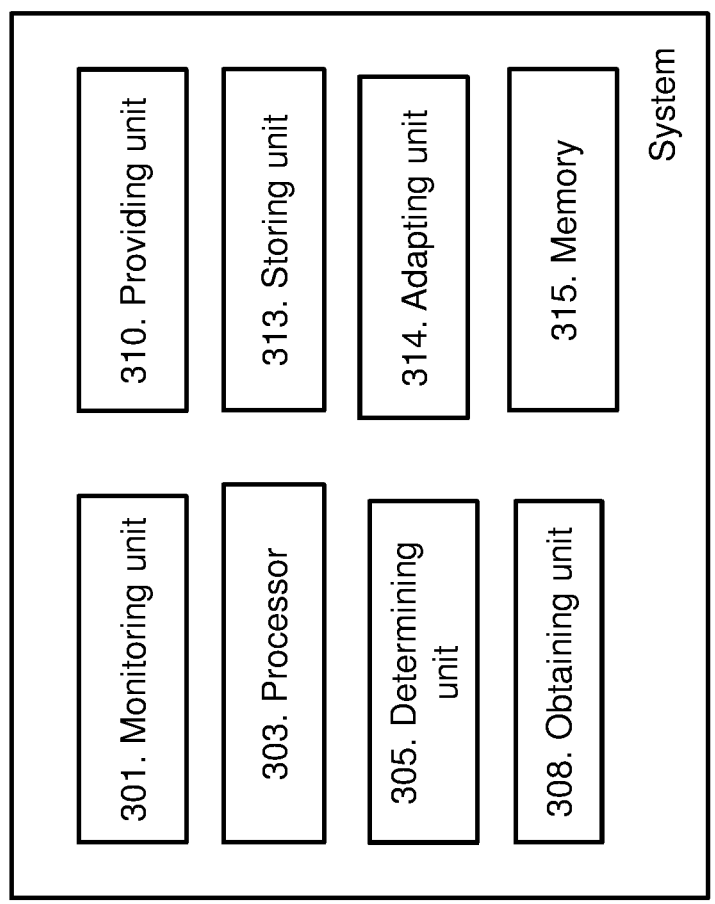
FIG. 3 is a schematic block diagram illustrating a system.

To perform the method steps shown in FIG. 2 for handling a driver's 103 use of an object displaying device 105 comprised in a vehicle 100, the system may comprise an arrangement as shown in FIG. 3.

The system for handling a driver's 103 use of an object displaying device 105 comprised in a vehicle 100 is adapted to, e.g., by means of a monitoring unit 301, monitor the driver's 103 use of the object displaying device 105. The monitoring unit 301 may for example be a driver monitoring device. The monitoring unit 301 may also be referred to as a monitoring module, a monitoring means, a monitoring circuit, means for monitoring, etc. The monitoring unit 301 may be, or may comprise, a processor 303 of the system. The monitoring unit 301 may be a driver monitoring device.

The system is further adapted to, e.g., by means of a determining unit 305, determine, based on the monitoring, a likelihood of that the driver 103 has detected a representation of the object 110 when using the object displaying device 105. The representation of the object 110 is visible to the driver 103 in the object displaying device 105, and wherein the object 110 is located in the surroundings of the vehicle 100. The determining unit 305 may also be referred to as a determining module, a determining means, a determining circuit, means for determining, etc. The determining unit 305 may be, or may comprise, the processor 303 of the system.

The vehicle 100 may comprises a one or a plurality of object displaying devices 105. The representation of the object 110 may be visible in at least two of the object displaying devices 105 in the plurality. A weight parameter may be associated with each of the at least two object displaying devices 105 in the likelihood determination.

The weight parameter may be based on at least one of: a distance between the object 110 and the vehicle 110, and an object size.

The monitoring may provide at least one of glance time information, head direction information, gaze direction information and eye opening information. The glance time information may indicate a glance time for the driver's 103 glance into the object displaying device 105. The head direction information may indicate a head direction of the driver 103 in relation to the object displaying device 105 and, the eye opening information may indicate a degree of opening of the driver's 103 eyes when glancing into the object displaying device 105.

The likelihood determination is further based on at least one of: a size of the object 110, distance between the object 110 and the vehicle 100, contrast of the object 110 in relation to the vehicle's 100 surroundings, light conditions, sun angle in relation to the vehicle 100 and object motion.

The system may be further adapted to, e.g., by means of an obtaining unit 308, obtain a confirmation of that the driver 103 has detected the representation of the object 110 when using the object displaying device 105. The obtaining unit 308 may also be referred to as an obtaining module, an obtaining means, an obtaining circuit, means for obtaining, etc. The obtaining unit 308 may be, or may comprise, the processor 303 of the system.

The system may be further adapted to, e.g., bye means of a providing unit 310, provide, based on the determined likelihood, feedback to the driver 103 related to its usage of the object displaying device 105. The providing unit 310 may also be referred to as a providing module, a providing means, a providing circuit, means for providing, etc. The providing unit 310 may be, or may comprise, the processor 303 of the system.

The likelihood may be determined further based on whether at least one of a haptic feedback device or an acoustic feedback device is activated or not. The haptic feedback device and the acoustic feedback device may indicate to the driver 103 that the object 110 is located in the surroundings of the vehicle 100.

The system may be further adapted to, e.g., by means of a storing unit 313, store monitoring information of the driver's 103 use of the object displaying device 105 over time. The storing unit 313 may also be referred to as a storing module, a storing means, a storing circuit, means for storing, etc. The storing unit 313 may be a memory.

The driver's 103 use of the object displaying device 105 may be monitored by a driver monitoring camera.

The object displaying device 105 may be at least one of a mirror and display which makes the object 110 or a representation of the object 110 visible to the driver 103.

The system may be further adapted to, e.g., by means of an adapting unit 314, to adapt safety and driver support systems based on the determined likelihood. The adapting unit 314 may also be referred to as an adapting module, an adapting means, an adapting circuit, means for adapting, etc. The adapting unit 314 may be, or may comprise, the processor 303 of the system.

A vehicle 100 comprises at least part of the system described above.

In some embodiments, the system comprises the processor 303 and a memory 315. The memory 315 comprises instructions executable by the processor 303. The memory 315 comprises one or more memory units. The memory 315 is arranged to be used to store data, received data streams, monitored information, determined likelihood, statistics, weight parameters, confirmation information, feedback information, monitoring information, threshold values, time periods, configurations, scheduling's, and applications to perform the methods herein when being executed in the system. The memory 315 may be the same as the storing unit 313, or the storing unit 313 may be the unit which stores information in the memory 315.

A computer program may comprise instructions which, when executed on at least one processor, cause the at least one processor to carry out the method according to any of the steps in FIG. 2. A carrier may comprise the computer program, and the carrier may be one of an electronic signal, optical signal, radio signal or computer readable storage medium.

The present mechanism for handling a driver's 103 use of an object displaying device 105 comprised in a vehicle 100 may be implemented through one or more processors, such as a processor 303 in the system arrangement depicted in FIG. 3, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the system. One such carrier may be in the form of a CD ROM disc. It is however feasible with other data carriers such as a memory stick. The computer program code can furthermore be provided as pure program code on a server and downloaded to the system.

Those skilled in the art will also appreciate that the monitoring unit 301, the determining unit 305, the obtaining unit 308, the providing unit 310, the storing unit 313 and the adapting unit 314 described above may refer to a combination of analog and digital circuits, and/or one or more processors configured with software and/or firmware, e.g., stored in a memory, that when executed by the one or more processors such as the processor 303 perform as described above. One or more of these processors, as well as the other digital hardware, may be included in a single ASIC, or several processors and various digital hardware may be distributed among several separate components, whether individually packaged or assembled into a system-on-a-chip (SoC).

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "adapted to" used herein may also be referred to as "arranged to", "configured to", "capable of" or "operative to".

It should also be emphasized that the steps of the methods defined in the appended claims may, without departing from the embodiments herein, be performed in another order than the order in which they appear in the claim.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A method for handling a driver's use of an object displaying device included in a vehicle, wherein the vehicle comprises a plurality of object displaying devices, the method comprising:
monitoring the driver's use of the plurality of object displaying devices; and
based on the monitoring, determining a likelihood that the driver has detected a representation of an object when using the object displaying device, wherein the representation of the object is visible to the driver in at least two of the object displaying devices, and the object is located in surroundings of the vehicle, and wherein a weight parameter is associated with each of the at least two object displaying devices in the likelihood determination, wherein the weight parameter of each of the at least two object displaying devices is based on a size of the associated object displaying device, wherein a first one of the at least two object displaying devices has a size greater than a second one of the at least two object displaying devices, and wherein the weight parameter of the first one of the at least two object displaying devices is greater than the weight parameter of the second one of the at least two object displaying devices.

2. The method according to claim 1 further comprising: based on the determined likelihood, adapting safety and driver support systems.

3. The method according to claim 1 wherein the weight parameter is based on at least one of: a distance between the object and the vehicle, and a size of the object.

4. The method according to claim 1 wherein the monitoring provides at least one of glance time information, head direction information, gaze direction information or eye opening information,
   wherein the glance time information indicates a glance time for the driver's glance into at least one of the object displaying devices,
   wherein the head direction information indicates a head direction of the driver in relation to the at least one object displaying device, and
   wherein the eye opening information indicates a degree of opening of the driver's eyes when glancing into the at least one object displaying device.

5. The method according to claim 1 further comprising: obtaining a confirmation that the driver has detected the representation of the object when using the at least two object displaying devices, wherein the confirmation comprises activation of a button by the driver or a voice command from the driver.

6. The method according to claim 1 further comprising: based on the determined likelihood, providing feedback to the driver related to the driver's usage of the at least two object displaying devices.

7. The method according to claim 6 wherein the likelihood is determined based on whether at least one of a haptic feedback device or an acoustic feedback device is activated or not, and wherein the at least one of the haptic feedback device and the acoustic feedback device indicate to the driver that the object is located in the surroundings of the vehicle.

8. The method according to claim 1 wherein the likelihood is determined based on whether at least one of a haptic feedback device or an acoustic feedback device is activated or not, and wherein the at least one of the haptic feedback device and the acoustic feedback device indicate to the driver that the object is located in the surroundings of the vehicle.

9. The method according to claim 1 further comprising: storing monitoring information of the driver's use of the at least two object displaying devices over time.

10. The method according to claim 1 wherein the object displaying device comprises at least one of a mirror or display which makes the object or a representation of the object visible to the driver.

11. The method of claim 1 wherein the likelihood determination is based on motion of the object, wherein it is determined likely that the driver has detected the representation of the object in at least one of the object displaying devices when motion of the object is indicated by movement of the representation of the object in one of the at least two object displaying devices.

12. A system for handling a driver's use of a plurality of object displaying devices included in a vehicle, the system being configured to:
   monitor the driver's use of the plurality of object displaying devices, wherein a representation of an object is visible in at least two of the object displaying devices;
   based on the monitoring, determine a likelihood that the driver has detected a representation of an object when using the object displaying device, wherein the representation of the object is visible to the driver in the object displaying device, and the object is located in surroundings of the vehicle, and wherein the likelihood determination is based on motion of the object; and
   wherein a weight parameter is associated with each of the at least two object displaying devices in the likelihood determination, wherein the weight parameter of each of the at least two object displaying devices is based on a size of the associated object displaying device, wherein a first one of the at least two object displaying devices has a size greater than a second one of the at least two object displaying devices, and wherein the weight parameter of the first one of the at least two object displaying devices is greater than the weight parameter of the second one of the at least two object displaying devices.

13. A vehicle comprising the system according to claim 12.

14. The system according to claim 12 wherein the system comprises a monitoring device configured to monitor the driver's use of the plurality of object displaying devices, and the monitoring device is configured to provide at least one of glance time information, head direction information, gaze direction information or eye opening information, wherein the glance time information indicates a glance time for the driver's glance into at least one of the object displaying devices, the head direction information indicates a head direction of the driver in relation to at least one of the object displaying devices, and the eye opening information indicates a degree of opening of the driver's eyes when glancing into at least one of the object displaying devices.

15. The system of claim 12 wherein it is determined likely that the driver has detected the representation of the object in at least one of the object displaying devices when motion of the object is indicated by movement of the representation of the object in one of the at least two object displaying devices.

16. A system for handling a driver's use of an object displaying device included in a vehicle, the system being configured to:
   monitor the driver's use of the object displaying device; and
   based on the monitoring, determine a likelihood that the driver has detected a representation of an object when using the object displaying device, wherein the representation of the object is visible to the driver in the object displaying device, and the object is located in surroundings of the vehicle, the system further comprising
   an obtaining unit for obtaining a confirmation that the driver has detected the representation of the object when using the object displaying device, wherein the confirmation comprises activation of a button by the driver or a voice command from the driver.

17. The system according to claim 16 wherein it is determined likely that the driver has detected the representation of the object in the object displaying device when motion of the object is indicated by movement of the representation of the object in the object displaying device.

\* \* \* \* \*